(12) United States Patent
Jaradi et al.

(10) Patent No.: US 11,975,604 B2
(45) Date of Patent: May 7, 2024

(54) VEHICLE FRAME ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 17/932,382

(22) Filed: Sep. 15, 2022

(65) Prior Publication Data

US 2024/0092165 A1   Mar. 21, 2024

(51) Int. Cl.
| | |
|---|---|
| *B60K 15/07* | (2006.01) |
| *B60K 1/04* | (2019.01) |
| *B62D 21/02* | (2006.01) |
| *B62D 43/10* | (2006.01) |
| *B60K 15/03* | (2006.01) |

(52) U.S. Cl.
CPC ............... *B60K 15/07* (2013.01); *B60K 1/04* (2013.01); *B62D 21/02* (2013.01); *B62D 43/10* (2013.01); *B60K 2015/03407* (2013.01)

(58) Field of Classification Search
CPC ................ B60K 12/07; B60K 1/04; B60K 2015/03407; B62D 21/02; B62D 43/10
See application file for complete search history.

(56) References Cited

U.S. PATENT DOCUMENTS

| | | | | |
|---|---|---|---|---|
| 8,141,904 | B2* | 3/2012 | Akaki | B62D 21/02 |
| | | | | 180/312 |
| 2008/0265621 | A1* | 10/2008 | Morschheuser | B62D 21/15 |
| | | | | 296/187.03 |
| 2009/0322123 | A1* | 12/2009 | Tanaka | B60R 19/02 |
| | | | | 296/203.02 |
| 2017/0036626 | A1 | 2/2017 | Barbat et al. | |
| 2019/0077468 | A1* | 3/2019 | Hulstein | B60G 9/00 |
| 2019/0210651 | A1* | 7/2019 | Svacha | B62D 33/077 |
| 2022/0063727 | A1* | 3/2022 | Faruque | B62D 21/11 |
| 2022/0177036 | A1* | 6/2022 | Faruque | B62D 25/082 |

FOREIGN PATENT DOCUMENTS

| | | | | |
|---|---|---|---|---|
| DE | 202014103165 | U1 * | 9/2014 | ............ B60R 19/14 |
| DE | 102017009199 | A1 | 4/2018 | |
| FR | 2942188 | A1 * | 8/2010 | ............... B60K 1/04 |
| JP | 3678259 | B2 * | 8/2005 | |
| JP | 2010083259 | A * | 4/2010 | |
| KR | 10-0534330 | B1 | 12/2005 | |
| KR | 10-00811915 | B1 | 3/2008 | |
| KR | 10-1181015 | B1 | 9/2012 | |
| KR | 101181015 | B1 * | 9/2012 | |

\* cited by examiner

*Primary Examiner* — Karen Beck
(74) *Attorney, Agent, or Firm* — Frank A. MacKenzie; Bejin Bieneman PLC (57) ABSTRACT

A vehicle includes a first rail and a second rail elongated along a vehicle-longitudinal axis and spaced from each other along a vehicle-lateral axis. The vehicle includes an energy storage device between the first rail and the second rail. The vehicle includes a support structure between the first rail and the second rail. The vehicle includes a cable under tension and extending from the first rail to the second rail, the cable between the energy storage device and the support structure.

20 Claims, 7 Drawing Sheets

VEHICLE FRAME ASSEMBLY

BACKGROUND

A vehicle may include a frame assembly that supports components and systems of the vehicle, e.g., a propulsion system, a braking system, seats for use by an occupant of the vehicle, etc. The frame assembly may be of a unibody construction. In the unibody construction, a body, e.g., rockers, pillars, roof rails, etc., serves as the vehicle frame, and the body (including the rockers, pillars, roof rails, etc.) may be unitary, i.e., a continuous one-piece unit. As another example, the frame assembly may have a body-on-frame construction (also referred to as a cab-on-frame construction). In other words, the body and frame are separate components, i.e., are modular, and the body is supported on and affixed to the frame. Alternatively, the frame assembly may have any suitable construction. The frame assembly may be formed of any suitable material, for example, steel, aluminum, carbon fiber, etc.

DETAILED DESCRIPTION

A vehicle includes a first rail and a second rail elongated along a vehicle-longitudinal axis and spaced from each other along a vehicle-lateral axis. The vehicle includes an energy storage device between the first rail and the second rail. The vehicle includes a support structure between the first rail and the second rail. The vehicle includes a cable under tension and extending from the first rail to the second rail, the cable between the energy storage device and the support structure.

The energy storage device may include a fuel tank.

The energy storage device may include a battery.

The support structure may be vehicle-forward of the energy storage device.

The support structure may be vehicle-rearward of the energy storage device.

The support structure may include a tire tub, and the cable may be between the tire tub and the energy storage device.

The vehicle may include a tire supported in the tire tub.

The cable may extend along an outer surface of the tire tub.

The cable may apply a normal force to the tire tub.

The vehicle may include an airbag supported by and extending along the cable.

The vehicle may include a tensioner supported by the first rail and connected to the cable.

The vehicle may include a tire supported by the support structure.

A vehicle includes a first rail and a second rail elongated along a vehicle-longitudinal axis and spaced from each other along a vehicle-lateral axis. The vehicle includes an energy storage device between the first rail and the second rail. The vehicle includes a support structure between the first rail and the second rail. The vehicle includes a cable extending from the first rail to the second rail, the cable between the energy storage device and the support structure. The vehicle includes an airbag supported by the cable.

The support structure may include a tire tub.

The vehicle may include an inflator fluidly coupled to the airbag, the inflator supported in the tire tub opposite the airbag.

The energy storage device may include a fuel tank.

The energy storage device may include a battery.

The airbag may be inflatable to an inflated position elongated along the cable between the support structure and the energy storage device.

The airbag in the inflated position may be wider along the vehicle-lateral axis then an end of the energy storage device closest to the support structure.

The airbag in the inflated position may be wider along the vehicle-lateral axis then the support structure.

With reference to the Figures, wherein like numerals indicate like parts throughout the several views, a vehicle 20 having a first rail 22 and a second rail 24 is shown. The first rail 22 and the second rail 24 are both elongated along a longitudinal axis A1 and spaced from each other along a lateral axis A2. The vehicle 20 includes an energy storage device 26 between the first rail 22 and the second rail 24. The vehicle 20 includes a structure 28 between the first rail 22 and the second rail 24. The vehicle 20 includes a cable 30 under tension and extending from the first rail 22 to the second rail 24. The cable 30 is between the energy storage device 26 and the structure 28.

The cable 30 may control kinematics of the structure 28, e.g., during certain impacts to the vehicle 20 and to reduce a probability of interference of the structure 28 with the energy storage device 26. For example, the cable 30 may control movement of the structure 28 relative to the energy storage device 26. The tension in the cable 30 may provide an initial normal force, e.g., away from the structure 28 and toward the energy storage device 26.

The adjectives "first" and "second" are used throughout this document as identifiers and are not intended to signify importance or order.

The vehicle 20 may be any suitable type of ground vehicle, e.g., a passenger or commercial automobile such as a sedan, a coupe, a truck, a sport utility, a crossover, a van, a minivan, a taxi, a bus, etc. The vehicle 20 defines the longitudinal axis A1, e.g., extending between a front F and a rear R of the vehicle 20. The vehicle 20 defines the lateral axis A2, e.g., extending between a right side RS and a left side LS of the vehicle 20. The vehicle 20 defines a vertical axis A3, e.g., extending between a top and a bottom of the vehicle 20. The longitudinal axis A1, the lateral axis A2, and the vertical axis A3 are perpendicular to each other.

The vehicle 20 includes a vehicle frame 31. The frame 31 may include the first rail 22 and the second rail 24. The vehicle frame may be of a unibody construction in which the frame 31 is unitary with a vehicle body including the first rail 22 and the second rail 24, pillars, a roof, a floor 34, a tire tub 32, etc. As another example, the body and frame 31 may have a body-on-frame construction also referred to as a cab-on-frame construction in which the body and the frame 31 are separate components, i.e., are modular, and the body is supported on and affixed to the frame 31. Alternatively, the frame 31 and body may have any suitable construction. The frame 31 and body may be of any suitable material, for example, steel, aluminum, and/or fiber-reinforced plastic, etc.

The first rail 22 and the second rail 24 are elongated along the longitudinal axis A1. For example, the first rail 22 and the second rail 24 may be elongated between the front F and the rear R of the vehicle 20. The first rail 22 and the second rail 24 may extend partially along a length of the vehicle 20. The first rail 22 and the second rail 24 may extend fully along the length of the vehicle 20. The first rail 22 and the second rail 24 may extend, for example from a front bumper to a rear bumper of the vehicle 20. The first rail 22 and the second rail 24 are spaced from each other along the lateral axis A2. For example, the first rail 22 may be proximate the right side RS of the vehicle 20, i.e., closer to the right side RS than the left side LS, and the second frame 31 rail may be proximate the left side LS of the vehicle 20.

The vehicle 20 includes a floor 34 that supports components, occupants, cargo, etc., of the vehicle 20. The floor 34 extends along the longitudinal axis A1 and the lateral axis A2. The floor 34 may extend under a passenger compartment and/or cargo compartment of the vehicle 20. For example, the floor 34 may support seats in the passenger compartment. As another example, the floor 34 may support cargo in a bed of pick-up truck or a trunk of a sedan. The floor 34 may be above the first rail 22 and the second rail 24, e.g., relative to the vertical axis A3. In other words, the first rail 22 and the second rail 24 may be between the floor 34 and ground supporting the vehicle 20.

The vehicle 20 includes tires 36 that support the vehicle 20, e.g., on a road surface. The tires 36 provide movement to the vehicle 20, e.g., by transferring force to the road surface from a propulsion system and/or a braking system of the vehicle 20, by changing angle relative to the frame 31 and/or the body of the vehicle 20, etc. The tires 36 may be tubeless tires supported on a rim, or any suitable type. Tires 36 may by at the front F and the rear R of the vehicle 20, e.g., a pair of rear tires 36 and a pair of front tires 36.

The propulsion system translates the energy into motion of the vehicle 20. The propulsion system may be, for example, a conventional powertrain including an internal-combustion engine coupled to a transmission that transfers rotational motion to the tires 36; an electric powertrain including an electric motor and a transmission that transfers rotational motion to the tires 36; a hybrid powertrain including elements of the conventional powertrain and the electric powertrain; or any other type of propulsion.

The energy storage device 26 stores energy for operating the vehicle 20, e.g., for use by the propulsion system to generate torque applied to the tires 36. The energy storage device 26 may be below the floor 34 along the vertical axis A3, e.g., below the passenger cabin. The energy storage device 26 may be between the first rail 22 and the second rail 24 along the lateral axis A2, e.g., center between the left and the right of the vehicle 20. The energy storage device 26 may be fixed to the frame 31 and/or the body, e.g., floor 34, the first rail 22, the second rail 24, etc.

The energy storage device 26 may include a fuel tank. The fuel tank defines a chamber in which fuel is stored. The fuel tank may store fuel in liquid and/or gaseous form, e.g., gasoline, diesel, natural gas, hydrogen, etc. The fuel tank may include a fuel filter, a fuel pump, and/or and other suitable structure for providing fuel from the chamber to, for example, an internal combustion engine.

The energy storage device 26 may include a battery. The battery may be of any suitable type for vehicular electrification, for example, lithium-ion batteries, nickel-metal hydride batteries, lead-acid batteries, or ultracapacitors, as used in, for example, plug-in hybrid electric vehicles PHEVs, hybrid electric vehicles HEVs, or battery electric vehicles BEVs. The battery includes a battery tray and at least one battery module fixed to the battery tray. In examples including multiple battery modules, adjacent ones of the battery modules are connected to each other. Each battery module may include one or more battery cells. The battery tray may include a battery compartment that receives the battery modules. The battery may include any suitable hardware, e.g., wiring, connectors, circuits, etc., connecting the battery modules to each other and to electrified components of the vehicle 20.

The tire tub 32 of the vehicle 20 defines a storage area for a spare tire 38. The tire tub 32 may include a bottom 40 and one or more sidewalls 42 extending upward from the bottom 40. The sidewalls 42 may include a step 44, e.g., extending horizontally away from a vertical surface. The tire tub 32 may extend downward below the floor 34, e.g., along the vertical axis A3. The tire tub 32 may be between the first rail 22 and the second rail 24, e.g., along the lateral axis A2. The tire tub 32 may be at the rear R of the vehicle 20. The tire tub 32 maybe at a front F of the vehicle 20 (not shown). The tire tub 32 may be a component of the vehicle frame 31 and/or the vehicle 20 body.

The spare tire 38 is a replacement for one of the tires 36, e.g., when one of the tires 36 is flat or otherwise inoperable. The spare tire 38 may be the same as the tires 36, e.g., having similar rating, size, etc. The spare tire 38 may be designed for limited use, e.g., having a lower speed rating, a smaller diameter, etc., than the tires 36. The spare tire 38 may be supported between the first rail 22 and the second rail 24, e.g., along the lateral axis A2. The spare tire 38 may be supported by the tire tub 32. For example, the spare tire 38 may be supported by the bottom of the tire tub 32 and may be surrounded by the sidewall 42(s). The spare tire 38 is vehicle-rearward of the energy storage device 26, e.g., in the tire tub 32 at the rear R of the vehicle 20. The spare tire 38 may be vehicle-forward of the energy storage device 26, e.g., in the tire tub 32 at the front F of the vehicle 20.

The cable 30 controls kinematics of the structure 28 relative to the energy storage device 26, e.g., during certain impacts to the vehicle 20. The structure 28 of the present example includes, e.g., the tire tub 32 and the spare tire 38. However, the structure 28 could be any structure of the vehicle 20 that could interface with the energy storage device 26 during certain impacts to the vehicle 20, e.g., other components of the frame 31 and/or the body. The cable 30 extends from the first rail 22 to the second rail 24, e.g., along the lateral axis A2. The cable 30 is fixed to the first rail 22 and the second rail 24. The cable 30 is between the energy storage device 26 and the structure 28, e.g., between the tire tub 32 and the energy storage device 26 along the longitudinal axis A1. The cable 30 may extend along an outer surface of the structure 28, e.g., along at outer surface of the tire tub 32. The outer surface of the tire tub 32 may extend along the sidewall 42 opposite the spare tire 38. In other words, the sidewall 42 may be between the spare tire 38 are the cable 30 along the longitudinal axis A1. The cable 30 may be at the step 44 of the sidewall 42. The cable 30 may be below the floor 34 along the vertical axis A3. The cable 30 may extend from the tire tub 32 away from the energy storage device 26, e.g., transverse to the lateral axis A2 and the longitudinal axis A1.

The cable 30 is under tension. In other words, the cable 30 may include internal stress that applies force from the cable 30 to other components of the vehicle 20. For example, the cable may apply force to the first rail 22 and the second rail 24 urging them toward each other. The cable 30 may apply a normal force to the structure 28, e.g., the tension in the cable 30 may urge the tire tub 32 away from the energy storage device 26. For example, tensioners 46 may fix the cable 30 to the first rail 22 and the second rail 24 and provide tension to the cable 30. One tensioner 46 may be supported by the first rail 22 and connected to the cable 30, e.g., at the right side RS of the vehicle 20. Another tensioner 46 may be supported by the second rail 24 and connected to the cable 30. The tensioners 46 may be adjusted and/or fixed to provide a certain tension to the cable 30. For example, the tensioner 46 may include a threaded shaft 48 extending through the respective rail 22, 24 and a nut 50 engaged with the threaded shaft 48. The cable 30 may be fixed to the threaded shaft 48, e.g., at an eyelet at an end of the threaded shaft 48. The nut 50 may be opposite the cable 30 with the respective rail therebetween. Rotation of the nut 50 relative to the shaft 48 in a first direction may increase tension of the cable 30 and rotation of the nut 50 in an opposite direction may decrease tension of the cable 30. The tensioner 46 may include any other suitable structure, e.g., fasteners or the like, to provide a certain tension to the cable 30.

Figure 1:
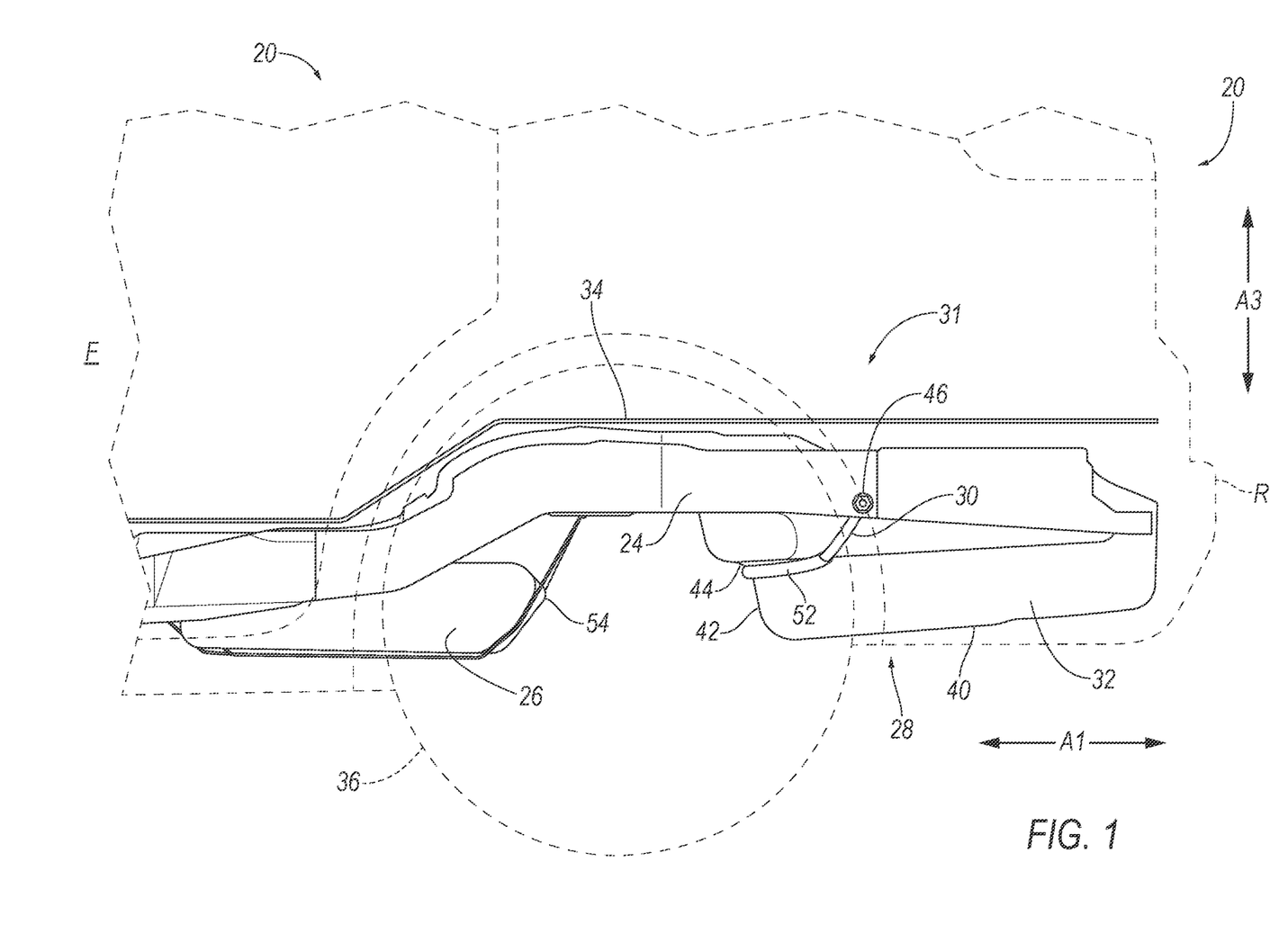
FIG. 1 is a side view of a rear portion of a vehicle.
Figure 2:
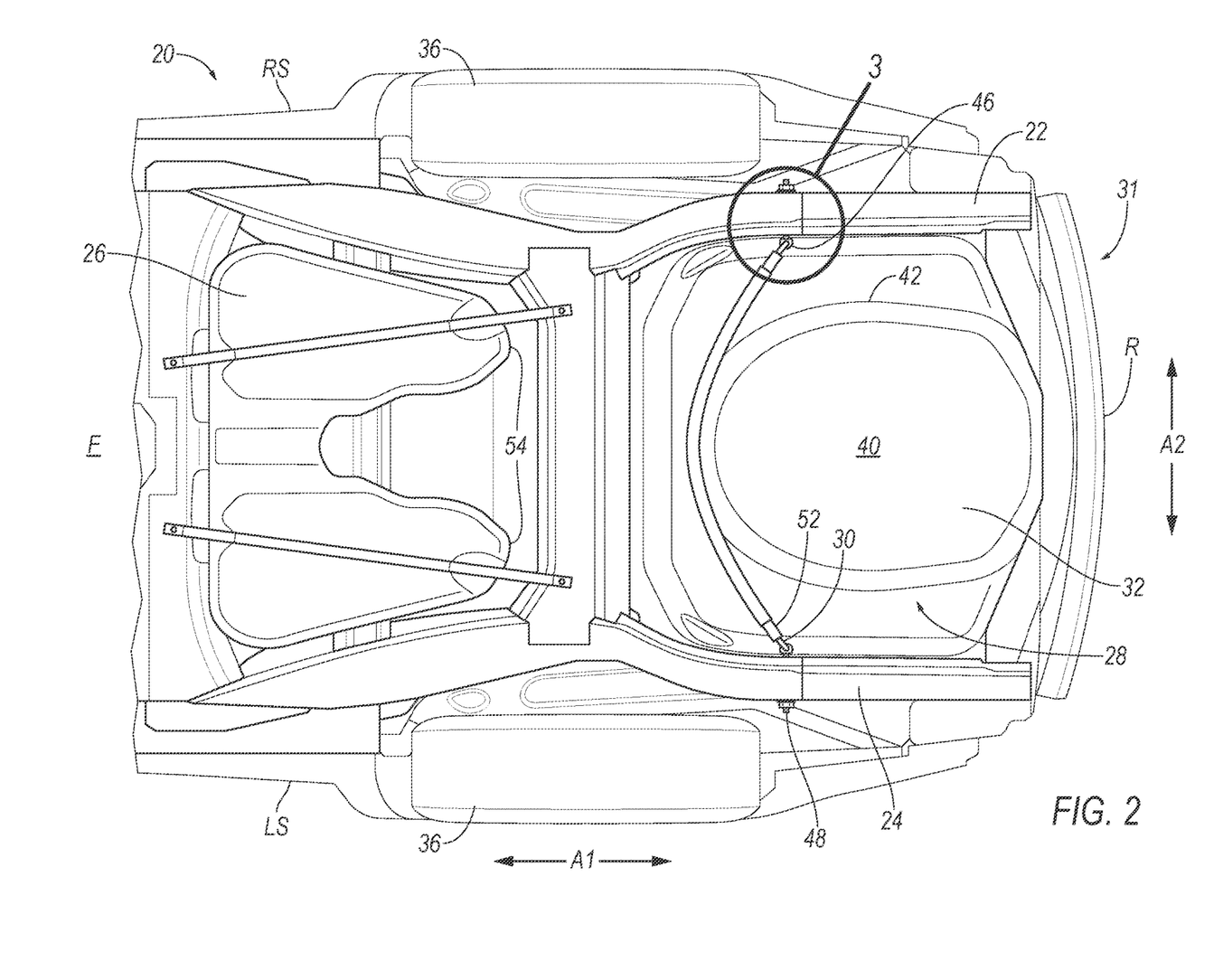
FIG. 2 is a bottom view of the rear portion of the vehicle.
Figure 3:
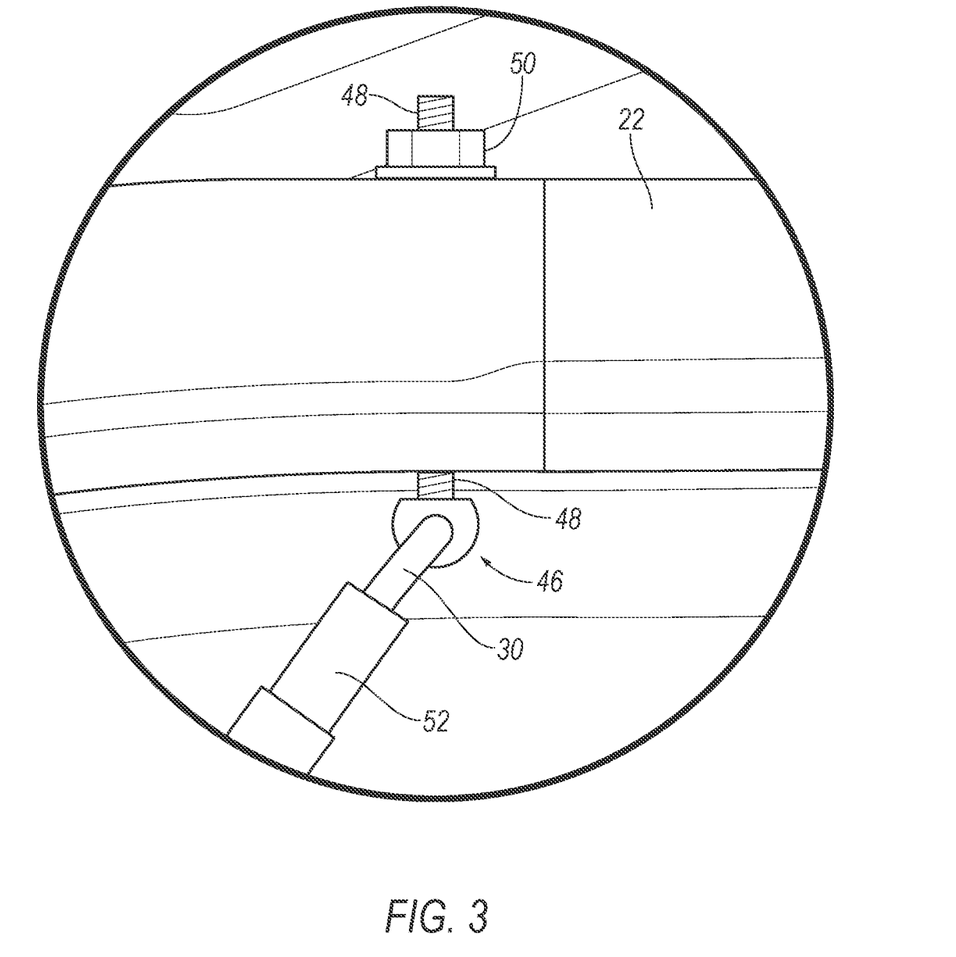
FIG. 3 is an enlarged view of a portion of FIG. 2.
Figure 4:
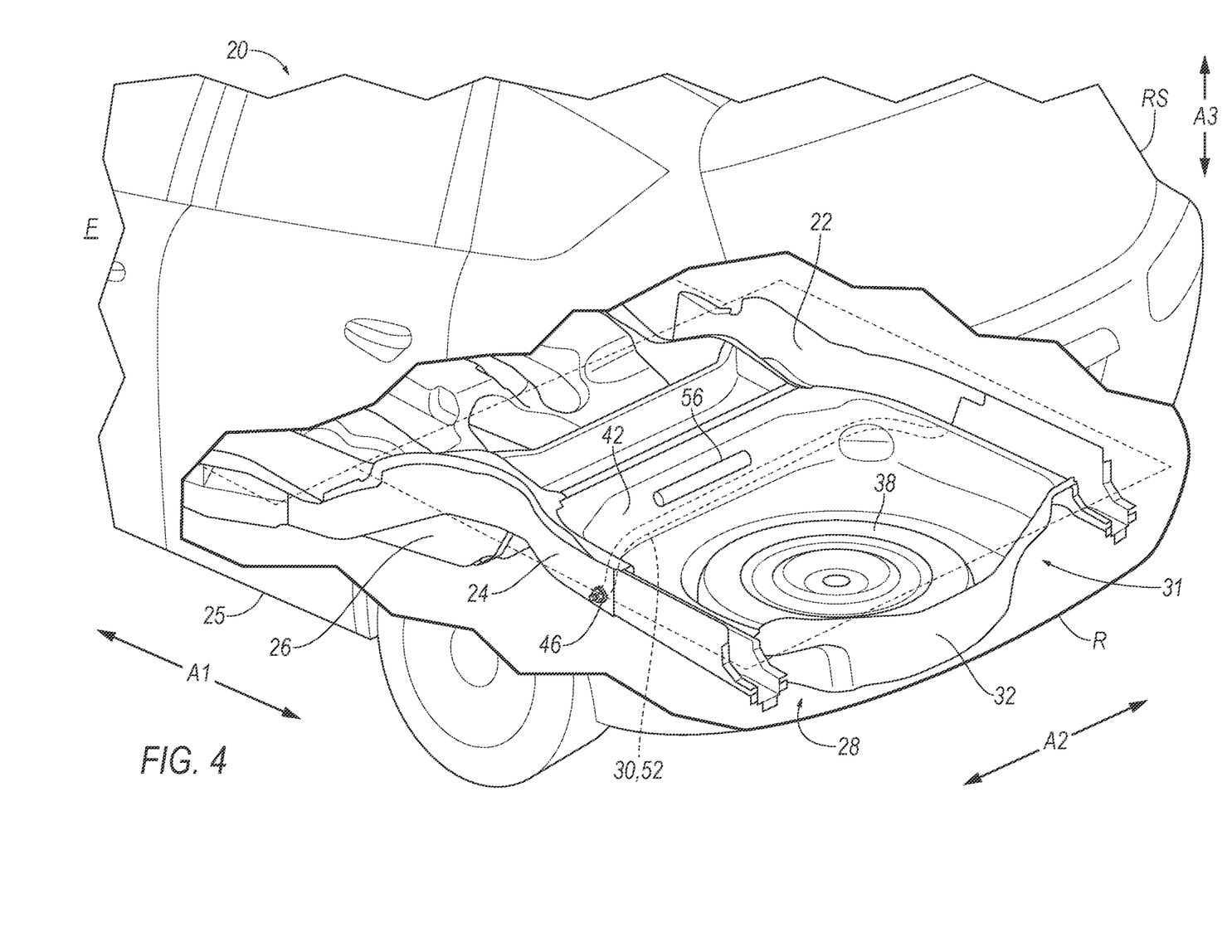
FIG. 4 is a perspective view of the rear portion of the vehicle.
Figure 5:
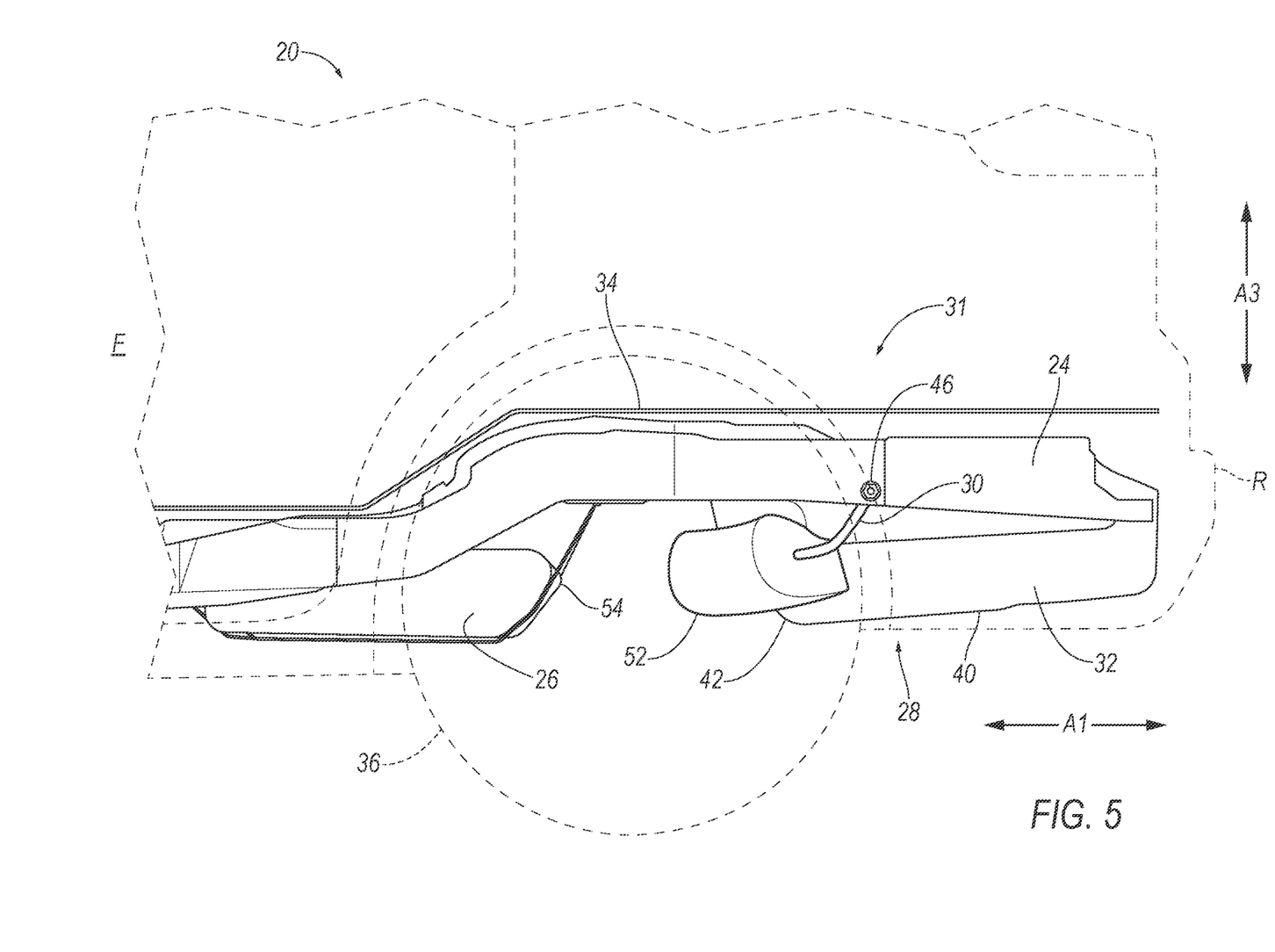
FIG. 5 is a side view of the rear portion of the vehicle with an airbag in an inflated position.
Figure 6:
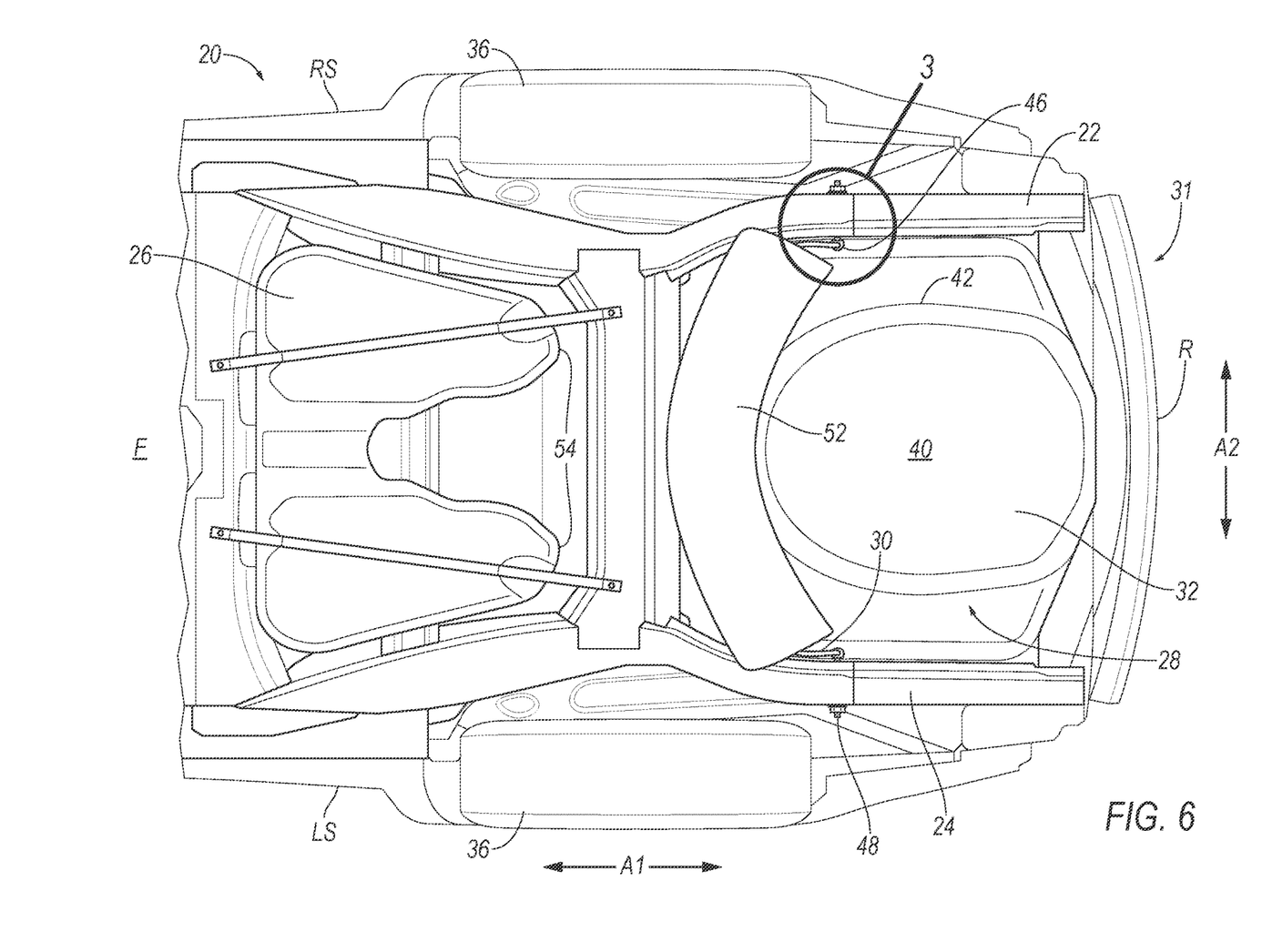
FIG. 6 is a bottom view of the rear portion of the vehicle with the airbag in the inflated position.

The vehicle 20 may include an airbag 52 supported by and extending along the cable 30. The airbag 52 is inflatable from an inflated position, shown in FIGS. 1 and 2, to an inflated position, shown in FIGS. 5 and 6. The airbag 52 in the inflated position may control kinematics of the structure 28, e.g., kinematics of the tire tub 32 and/or the spare tire 38, relative to the energy storage device 26 and during certain impacts to the vehicle 20. The airbag 52 in the inflated position may be elongated along the cable 30 between the structure 28 and the energy storage device 26, e.g., between the tire tub 32 and the energy storage device 26 along the longitudinal axis A1. The airbag 52 in the inflated position may surround the cable 30. The airbag 52 in the inflated position may be wider along the lateral axis A2 then an end 54 of the energy storage device 26 closest to the airbag 52. In other words, the end 54 of the energy storage device 26 closest to the airbag 52 may be narrower than the airbag 52 in the inflated position. The airbag 52 in the inflated position may be wider along the lateral axis A2 then the structure 28, e.g., wider than the tire tub 32 and the spare tire 38. The airbag 52 in the inflated position surrounding the cable 30 and/or being wider that than the energy storage device 26, the structure 28, the tire tub 32, and/or the spare tire 38 may reduce interference, e.g., contact, of the structure 28 with the energy storage device 26.

The vehicle 20 may include an inflator 56 fluidly coupled to the airbag 52. The inflator 56 is actuatable, e.g., by a computer 58, to inflate the airbag 52 to the inflated position. The inflator 56 expands the airbag 52 with inflation medium, such as a gas, to move the airbag 52 from an uninflated position to the inflated position. The inflator 56 may be, for example, a pyrotechnic inflator that ignites a chemical reaction to generate the inflation medium, a stored gas inflator that releases e.g., by a pyrotechnic valve stored gas as the inflation medium, or a hybrid. The inflator 56 supported in the tire tub 32 opposite the airbag 52. For example, the inflator 56 may be disposed in the tire tub 32 adjacent the spare tire 38 and fixed to the sidewall 42. Alternately, the inflator 56 may be supported by any suitable component. The inflator 56 may be connected to the inflation chamber through fill tubes, diffusers, etc.

Figure 7:
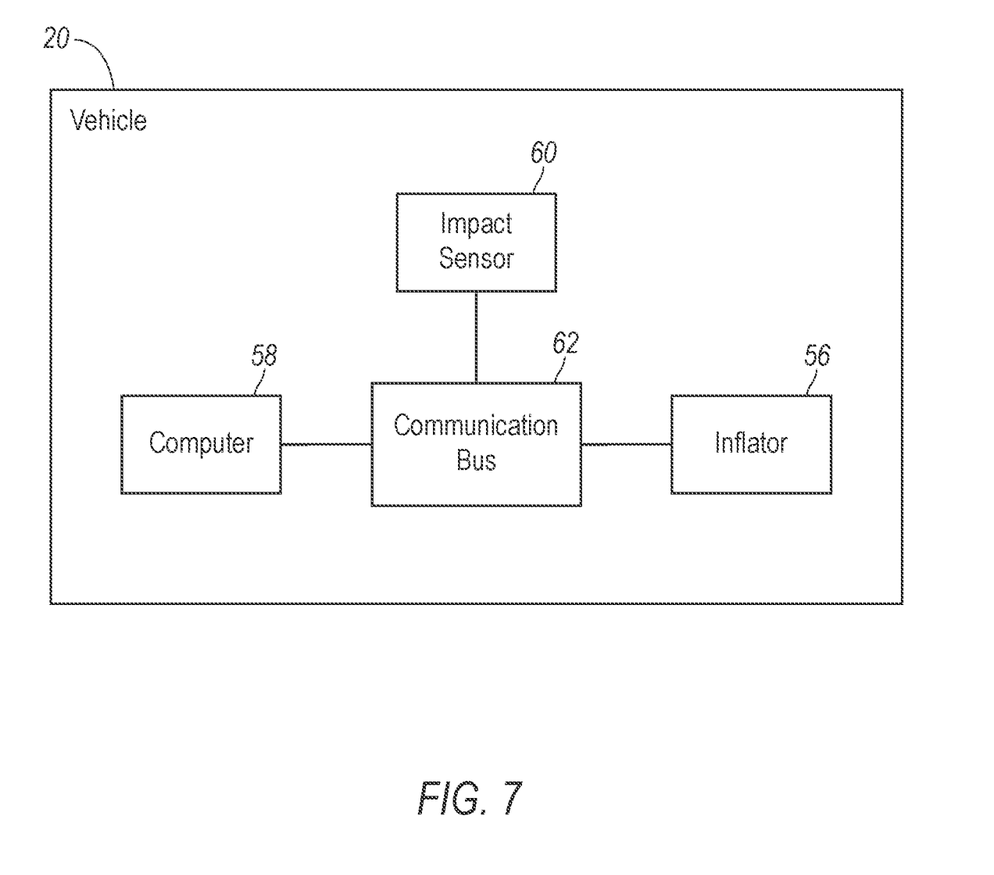
FIG. 7 is a block diagram of components of the vehicle.

With reference to FIG. 7, the vehicle 20 may include at least one impact sensor 60 for sensing impact of the vehicle 20, and the computer 58 in communication with the impact sensor and the inflator 56. The impact sensor 60 is configured to detect an impact to the vehicle 20. Alternatively or additionally to sensing impact, the impact sensor 60 may be configured to sense impact prior to impact, i.e., preimpact sensing. The impact sensor 60 may be of any suitable type, for example, post contact sensors such as accelerometers, pressure sensors, and contact switches; and pre impact sensor 60s such as radar, LIDAR, and vision sensing systems. The vision systems may include one or more cameras, CCD image sensors, CMOS image sensors, etc. The impact sensor 60 may be located at numerous points in or on the vehicle 20.

The computer 58 and the impact sensor 60 may be connected to a communication bus 62, such as a controller area network (CAN) bus, of the vehicle 20. The computer 58 may use information from the communication bus 62 to control the activation of the inflator 56. The inflator 56 may be connected to the computer 58, e.g., via the communication bus 62.

The computer 58 may be a microprocessor-based computer implemented via circuits, chips, or other electronic components. For example, the computer 58 may include a processor, a memory, etc. The memory of the computer 58 may include memory for storing programming instructions executable by the processor as well as for electronically storing data and/or databases. The computer 58 may activate the inflator 56, e.g., provide an impulse to a pyrotechnic charge of the inflator 56 when the impact sensor 60 senses an impact of the vehicle 20. The computer 58 may store instructions executable by the processor to inflate the airbag 52 in response to detecting a vehicle impact. For example, upon detecting a vehicle impact based on information from the impact sensor 60 the computer 58 may instruct the inflator 56 to inflate the airbag 52.

In operation, the airbag 52 is in the uninflated position under normal operating conditions of the vehicle 20. In the event of an impact, the impact sensor 60 may detect the impact and transmit a signal through the communication bus 62 to the computer 58. The computer 58 may transmit a signal to the inflator 56. Upon receiving the signal, the inflator 56 may discharge and inflate the airbag 52 with inflation medium from the uninflated position to the inflated position. During the impact, the structure 28, e.g., the tire tub 32 and the spare tire 38, may be urged along the longitudinal axis A1 toward the airbag 52 in the inflated position. The airbag 52 and the able control kinematics of the structure 28, e.g., the tire tub 32 and the spare tire 38.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a first rail and a second rail elongated along a vehicle-longitudinal axis and spaced from each other along a vehicle-lateral axis;
   an energy storage device between the first rail and the second rail;
   a support structure between the first rail and the second rail; and
   a cable under tension and extending from the first rail to the second rail, the cable between the energy storage device and the support structure.

2. The vehicle of claim 1, wherein the energy storage device includes a fuel tank.

3. The vehicle of claim 1, wherein the energy storage device includes a battery.

4. The vehicle of claim 1, wherein the support structure is vehicle-forward of the energy storage device.

5. The vehicle of claim 1, wherein the support structure is vehicle-rearward of the energy storage device.

6. The vehicle of claim 1, wherein the support structure includes a tire tub, and wherein the cable is between the tire tub and the energy storage device.

7. The vehicle of claim 6, further comprising a tire supported in the tire tub.

8. The vehicle of claim 6, wherein the cable extends along an outer surface of the tire tub.

9. The vehicle of claim 6, wherein the cable applies a normal force to the tire tub.

10. The vehicle of claim 1, further comprising an airbag supported by and extending along the cable.

11. The vehicle of claim 1, further comprising a tensioner supported by the first rail and connected to the cable.

12. The vehicle of claim 1, further comprising a tire supported by the support structure.

13. A vehicle, comprising:
    a first rail and a second rail elongated along a vehicle-longitudinal axis and spaced from each other along a vehicle-lateral axis;
    an energy storage device between the first rail and the second rail;
    a support structure between the first rail and the second rail;
    a cable extending from the first rail to the second rail, the cable between the energy storage device and the support structure; and
    an airbag supported by the cable.

14. The vehicle of claim 13, wherein the support structure includes a tire tub.

15. The vehicle of claim 14, further comprising an inflator fluidly coupled to the airbag, the inflator supported in the tire tub opposite the airbag.

16. The vehicle of claim 13, wherein the energy storage device includes a fuel tank.

17. The vehicle of claim 13, wherein the energy storage device includes a battery.

18. The vehicle of claim 13, wherein the airbag is inflatable to an inflated position elongated along the cable between the support structure and the energy storage device.

19. The vehicle of claim 18, wherein the airbag in the inflated position is wider along the vehicle-lateral axis then an end of the energy storage device closest to the support structure.

20. The vehicle of claim 18, wherein the airbag in the inflated position is wider along the vehicle-lateral axis then the support structure.

\* \* \* \* \*